(12) United States Patent
Komuro et al.

(10) Patent No.: US 10,794,696 B2
(45) Date of Patent: Oct. 6, 2020

(54) METHOD FOR IDENTIFYING NOISE DATA OF LASER RANGING DEVICE

(71) Applicant: HONDA MOTOR CO., LTD., Tokyo (JP)

(72) Inventors: Satoshi Komuro, Saitama (JP); Hiroki Iikura, Saitama (JP); Itoshi Naramura, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 354 days.

(21) Appl. No.: 15/916,443

(22) Filed: Mar. 9, 2018

(65) Prior Publication Data
US 2018/0274916 A1  Sep. 27, 2018

(30) Foreign Application Priority Data

Mar. 22, 2017 (JP) .................. 2017-055733

(51) Int. Cl.
| | | |
|---|---|---|
| G01C 3/08 | (2006.01) | |
| G01S 17/08 | (2006.01) | |
| G01S 7/487 | (2006.01) | |
| G01S 7/48 | (2006.01) | |
| G01S 7/497 | (2006.01) | |
| G01S 17/87 | (2020.01) | |
| G01S 17/42 | (2006.01) | |

(52) U.S. Cl.
CPC .............. *G01C 3/08* (2013.01); *G01S 7/487* (2013.01); *G01S 7/4808* (2013.01); *G01S 7/497* (2013.01); *G01S 17/08* (2013.01); *G01S 17/42* (2013.01); *G01S 17/87* (2013.01)

(58) Field of Classification Search
CPC ...... G01S 7/4972; G01S 7/4808; G01S 17/87; G01S 17/42
See application file for complete search history.

(56) References Cited

U.S. PATENT DOCUMENTS

2018/0067199 A1*  3/2018  Rowekamper .......... G01S 17/42

FOREIGN PATENT DOCUMENTS

| JP | 2004-234349 | 8/2004 |
|---|---|---|
| WO | 2014/132509 | 9/2014 |

* cited by examiner

*Primary Examiner* — Luke D Ratcliffe
(74) *Attorney, Agent, or Firm* — Rankin, Hill & Clark LLP

(57) ABSTRACT

The present invention provides a method for identifying noise data of laser ranging devices. The measurement data of a plurality of measurement points is acquired by a plurality of laser ranging devices 1A and 1B, which are placed such that the laser beam projection areas thereof overlap with each other. A set of measurement points common to the laser ranging devices 1A and 1B is extracted from the measurement points. Noise data is identified based on the measurement data of each of a plurality of (two) measurement points constituting the set of common measurement points.

4 Claims, 9 Drawing Sheets

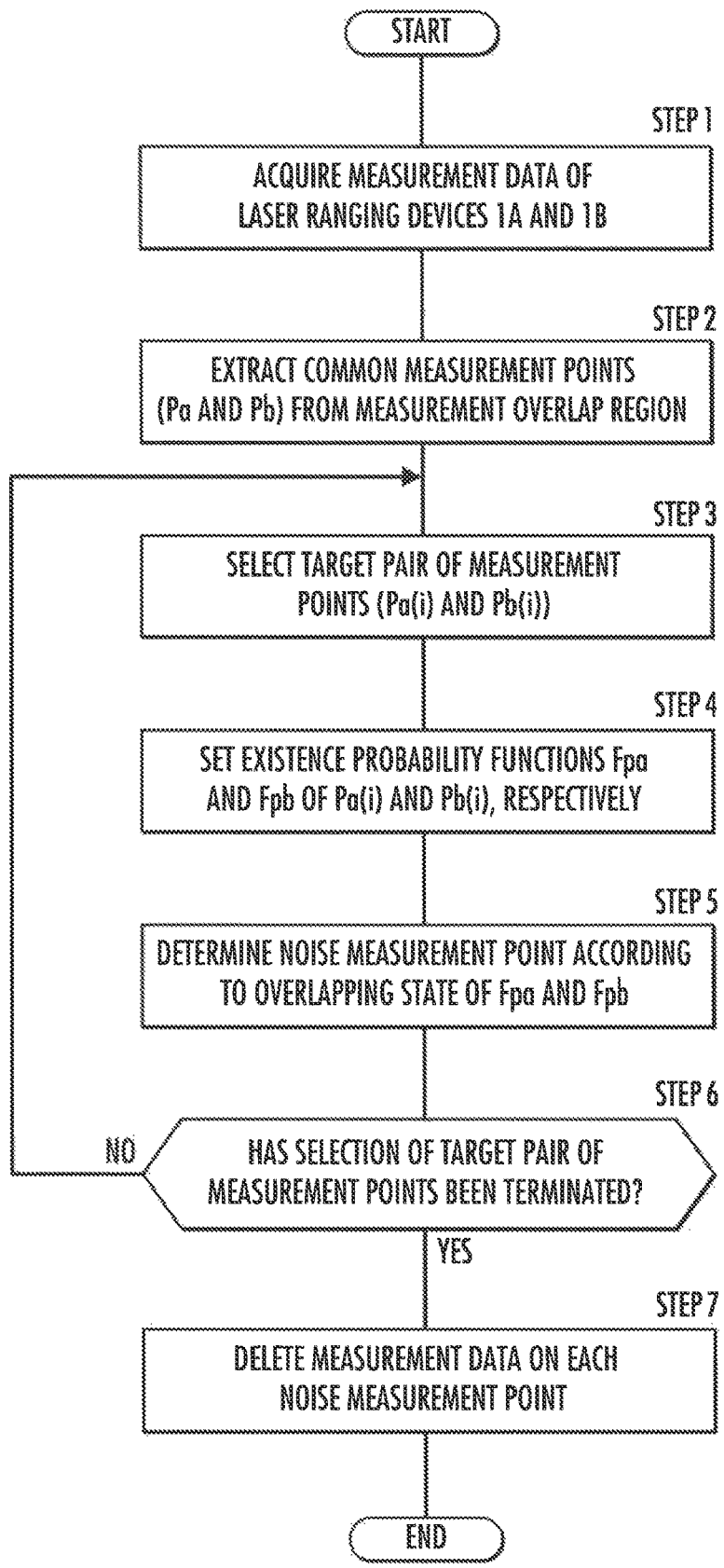

METHOD FOR IDENTIFYING NOISE DATA OF LASER RANGING DEVICE

BACKGROUND OF THE INVENTION

Field of the Invention

The present invention relates to a method for identifying low-reliability noise data among measurement data obtained by a laser ranging device, such as a laser range finder.

Description of the Related Art

A laser ranging device, such as a laser range finder, is configured to be capable of emitting a scanning laser beam to measure the distance between a plurality of measurement points (the reflection points of a laser beam) in the range of the scanning. This type of laser ranging device is used as, for example, a sensor for recognizing the external shape of an object, or a sensor for recognizing an environment in the operating environment of a mobile body (refer to, for example, International Application Publication No. WO2014/132509 and Japanese Patent Application Laid-Open No. 2004-234349).

In a laser ranging device, such as a laser range finder, there are cases where the measurement data (distance measurement data) of a measurement point corresponding to a laser beam emitted in a certain direction turns into abnormal measurement data (low-reliability measurement data) indicating a position that deviates from the position where an actual object exists due to a so-called multi-echo or the like.

Using such measurement data just as it is to recognize the shape or the position of an object will cause the shape or the position of the object to be erroneously recognized.

Therefore, in the case where distance measurement data obtained by a laser ranging device includes the abnormal measurement data as described above, a technique for properly identifying such abnormal measurement data as noise data is desired.

As a technique for identifying abnormal noise data, there is, for example, a widely known technique whereby to identify measurement data that indicates a so-called isolated point as abnormal noise data. However, in the distance measurement data obtained by a laser ranging device, the measurement data of a plurality of measurement points at positions that are relatively close to each other frequently becomes abnormal noise data. In this case, the noise data cannot be identified as the data of isolated points.

Further, in the case where non-uniform laser beam projecting directions are observed, then accurately identifying measurement data that indicates an isolated point tends to become difficult.

SUMMARY OF THE INVENTION

The present invention has been made in view of the background described above, and it is an object of the invention to provide a method that makes it possible to properly identify low-reliability noise data among the measurement data obtained by a laser ranging device.

A method for identifying noise data of a laser ranging device in accordance with the present invention is a method for identifying noise data among measurement data obtained by laser ranging devices that project laser beams in the direction of each of a plurality of projection lines to measure the distance of each of a plurality of measurement points corresponding to the plurality of projection lines, the method including:

a first step of acquiring the measurement data of a plurality of measurement points in the projection areas of the laser beams by each of a plurality of the laser ranging devices, the plurality of the laser ranging devices being placed such that the projection areas of the laser beams overlap with each other; and a second step of extracting, from the measurement points, a set of measurement points common to an n number (n: an integer of 2 or more) of the laser ranging devices and identifying the noise data from the measurement data of each of the n number of measurement points based on the measurement data of an n number of measurement points that constitute the set of common measurement points (a first aspect of the invention).

A supplementary description will be given of the terms in the present invention. The term "projection line" means a line that indicates the path of a laser beam output by a laser ranging device.

Further, the phrase "a set of measurement points common to an n number (n: an integer of 2 or more) of the laser ranging devices" means a set of an n number of measurement points composed of the measurement points of each of an n number of laser ranging devices, and means a set of the n number of measurement points that can be regarded as the laser beam reflection points at an identical local portion of an object in an external world.

According to the first aspect of the invention described above, the n number of measurement points are the common measurement points in the sense described above, so that if the measurement data of each of the n number of measurement points is normal measurement data, then the positions (spatial positions) of the n number of measurement points defined by the measurement data of the n number of measurement points will coincide with each other or will be close to each other.

Meanwhile, if the measurement data of the n number of measurement points includes low-reliability, abnormal measurement data, then the position of a measurement point indicated by the abnormal measurement data is highly likely to be a position that deviates from the position of a measurement point indicated by other measurement data.

Accordingly, the noise data can be identified from the measurement data of the n number of measurement points based on the measurement data of the n number of measurement points that constitute the set of common measurement points.

Thus, according to the first aspect of the invention, low-reliability noise data can be properly identified from the measurement data obtained by the laser ranging devices.

In the first aspect of the invention, preferably, the second step includes a step 2a of setting an existence area, in which it is estimated that an actual reflection point of a laser beam corresponding to each of the n number of measurement points exists in the vicinity of the position of each of the n number of measurement points defined by the measurement data of each of the n number of measurement points constituting the set of common measurement points, and a step 2b of identifying the noise data based on the mutual overlapping state of the n number of the existence areas set for the n number of measurement points, and the step 2a is configured to set each existence area such that each of the n number of existence areas has a size determined based on a predetermined value in an error range of the measurement value of the distance of a measurement point indicated by the measurement data of the measurement point corresponding to each existence area and a predetermined value in an error range of the direction of the projection line of a laser beam corresponding to the measurement point (a second aspect of the invention).

The predetermined value in the error range of the measurement value of the distance of a measurement point and the predetermined value in the error range of the direction of the projection line of a laser beam mean predetermined values in ranges identified or set in advance as the ranges of errors that can occur in each laser ranging device due to the specification or performance of each laser ranging device.

According to the second aspect of the invention, each existence area corresponding to each of the n number of measurement points is set to have the size determined based on a predetermined value in the error range of the measurement value of the distance of a measurement point indicated by the measurement data of the measurement point corresponding to the existence area and a predetermined value in an error range of the direction of the projection line of a laser beam corresponding to the measurement point. This makes it possible to set an existence area having a proper size for each of the n number of measurement points.

Consequently, the noise data can be identified with high reliability based on the mutual overlapping state of the n number of the existence areas that have been set for the n number of measurement points.

In the second aspect of the invention described above, the step 2b may be configured to identify, as noise data, the measurement data of at least one measurement point among the n number of measurement points in the case where the n number of existence areas do not overlap with each other (a third aspect of the invention).

Thus, the noise data can be identified with high reliability.

Further, in the second aspect of the invention described above, if the n number is, for example, two, then the step 2b may be configured to determine, in the case where two existence areas corresponding to the two measurement points overlap with each other such that one existence area of the two existence areas includes a measurement point corresponding to the other existence area, that the measurement data of the measurement point corresponding to at least the one existence area is not the noise data (a fourth aspect of the invention).

With this arrangement, measurement data that is not noise data can be identified with high reliability.

In the second aspect of the invention described above, in the case where the n number is two, the second step preferably further includes:

a step 2c of setting an existence probability function for each existence area corresponding to each of the two measurement points such that the position of a measurement point corresponding to the existence area is the position of a mode, the existence probability function representing the distribution of the existence probability of the actual reflection point corresponding to the existence area by normal distribution;

a step 2d of preparing a corrected existence probability function in the case where two existence areas overlap with each other such that one existence area of the two existence areas corresponding to the two measurement points does not include a measurement point corresponding to the other existence area and the other existence area does not include a measurement point corresponding to the one existence area, the corrected existence probability function being obtained by correcting the existence probability function corresponding to one existence area of the two existence areas such that a function value in an area where the two existence areas overlap with each other becomes a resultant value of the function values of the existence probability functions corresponding to the two existence areas; and a step 2e of determining, in a case where a position of an average value of the corrected existence probability function is included in the other existence area of the two existence areas, that the measurement data of at least one measurement point of the two measurement points is not the noise data, and determining, in a case where the position of the average value of the corrected existence probability function is not included in the other existence area of the two existence areas, that the measurement data of at least one measurement point of the two measurement points is the noise data.

A Fifth Aspect of the Invention

With this arrangement, measurement data that is the noise data and measurement data that is not the noise data can be properly discriminated and identified by using the existence probability function.

BRIEF DESCRIPTION OF THE DRAWINGS

FIG. 5 is a flowchart illustrating the processing by the arithmetic processing unit illustrated in FIG. 1A;

DESCRIPTION OF THE PREFERRED EMBODIMENTS

Figure 1A:
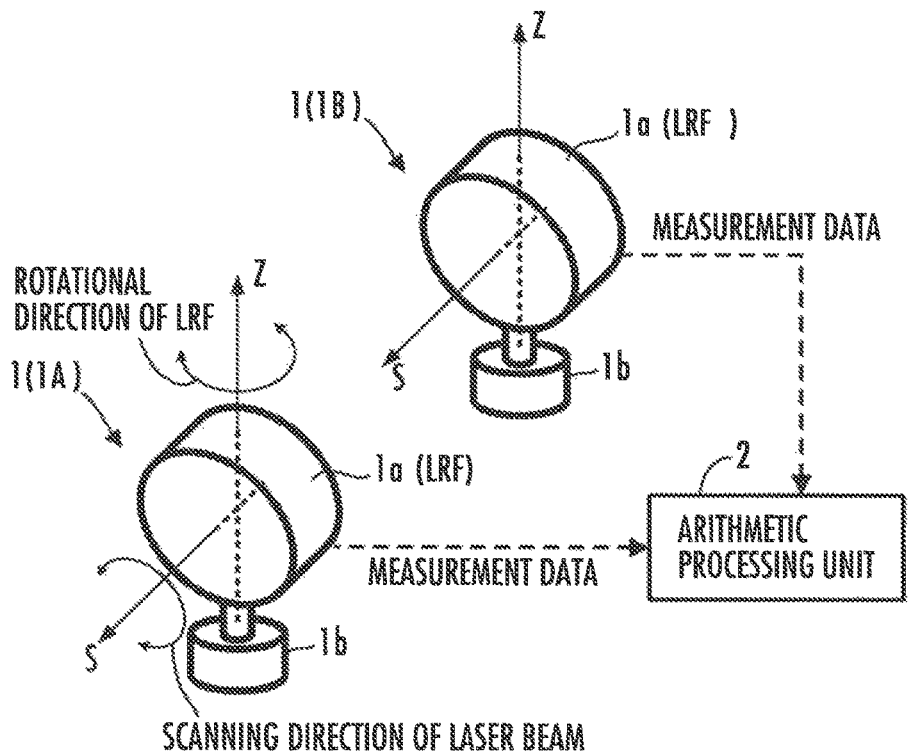
FIG. 1A is a schematic perspective view of a system equipped with two laser ranging devices in an embodiment of the present invention.
Figure 1B:
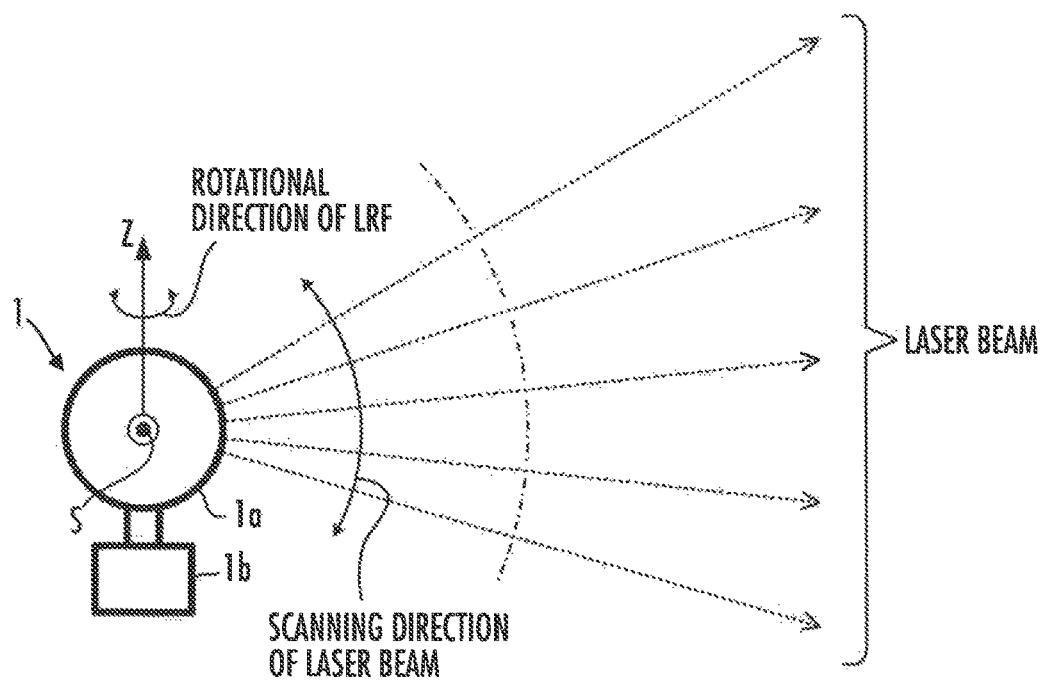
FIG. 1B is a diagram illustrating each laser ranging device observed in the direction of the S-axis in FIG. 1A.

An embodiment of the present invention will be described below with reference to FIG. 1A to FIG. 9B. Referring to FIG. 1A and FIG. 1B, a system equipped with two laser ranging devices 1A and 1B will be described in the present embodiment.

The laser ranging devices 1A and 1B are ranging devices having the same structure. Hereinafter, when there is no need to discriminate between the laser ranging devices 1A and 1B, the laser ranging devices will be referred to simply as a laser ranging device 1.

Each laser ranging device 1 includes a laser range finder 1a, which is a main unit thereof, and an actuator 1b, which rotatively drives the laser range finder 1a (hereinafter referred to as "the LRF 1a").

The LRF 1a has a publicly known structure, and outputs a laser beam to perform scanning in a predetermined scanning range (a predetermined angle range) in a direction about a single axis, e.g., in the direction of the S-axis illustrated in FIG. 1A and FIG. 1B. More specifically, the LRF 1a outputs a laser beam such that projection lines, which indicate the projecting directions of the laser beam (the lines that provide the projection paths of the laser beam, namely, the lines illustrated by the dashed lines in FIG. 1B), are rotated in the direction about the S-axis in the predetermined angle range, as illustrated in FIG. 1B.

Then, for each of a plurality (a predetermined number) of projecting directions of the laser beams in the scanning range, the LRF 1a measures the distance of an object that reflects the laser beam output in each projecting direction (distance from the LRF 1) according to a time-of-flight (TOF) measurement technique, and outputs the measurement data. In this case, the plurality of projecting directions of the laser beam are, for example, the directions shifted by a predetermined pitch angle in the direction about the S-axis.

The actuator 1b of each laser ranging device 1 is composed of, for example, an electric motor. Further, the actuator 1b is connected to the LRF 1a so as to be capable of rotatively driving the LRF 1a in a direction orthogonal to the S-axis direction, e.g. in the direction about the Z-axis illustrated in FIG. 1A and FIG. 1B. This enables the orientation of the LRF 1a to be changed in the direction about the Z-axis and also enables a laser beam to be projected in the direction about the X-axis at a plurality of rotational angle positions of the LRF 1a in the direction about the Z-axis.

Figure 2:
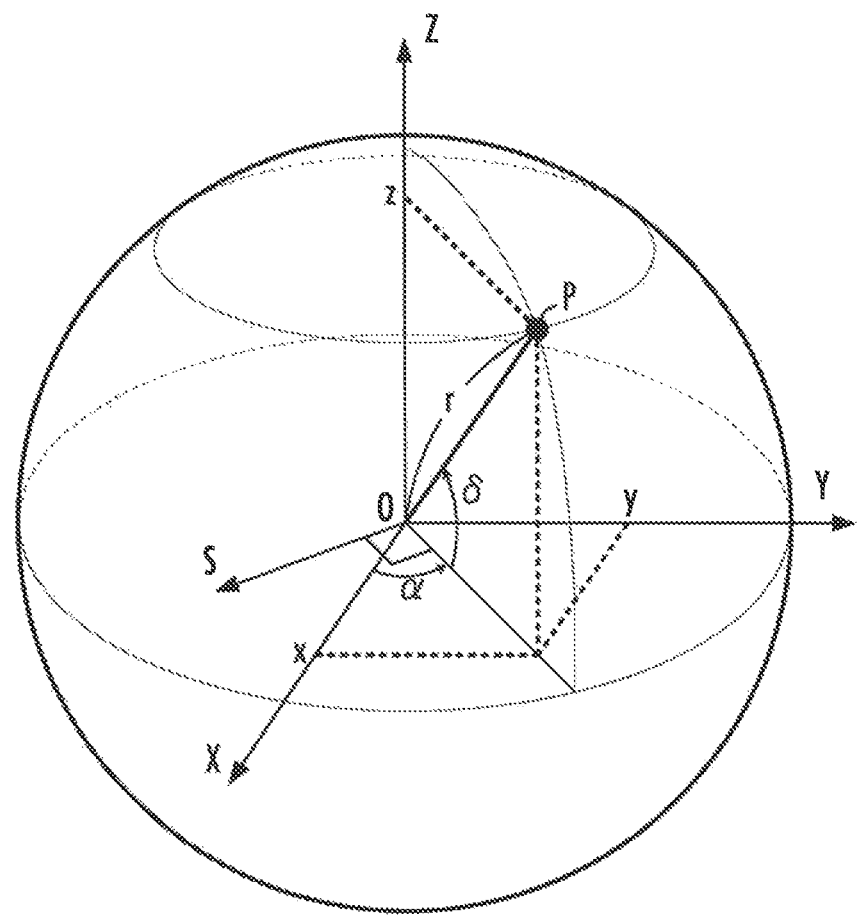
FIG. 2 is an explanatory diagram related to the operations of the laser ranging devices of the embodiment.
Figure 3:
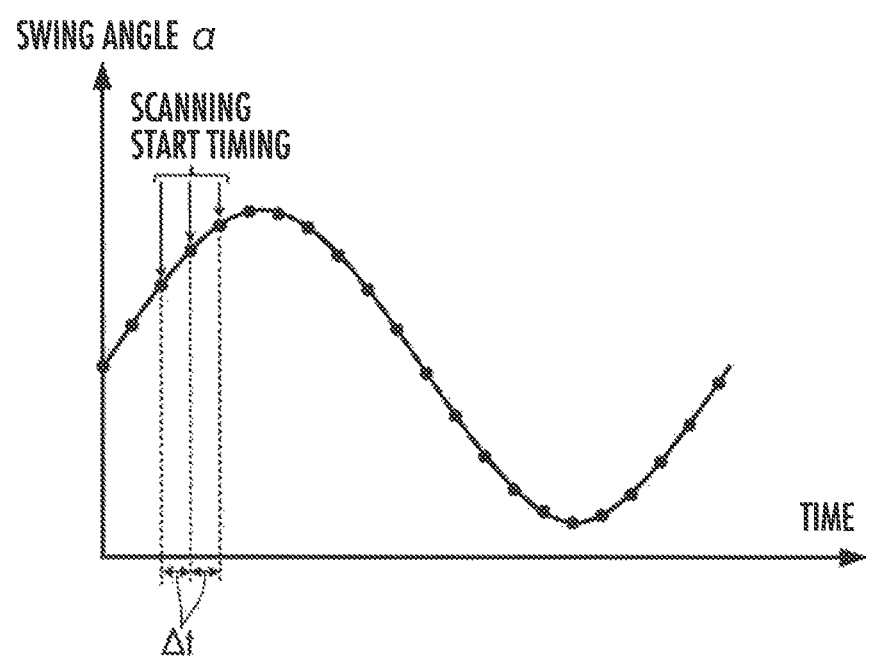
FIG. 3 is a graph related to the operations of the laser ranging devices of the embodiment.

For example, the LRF 1a can be rotated in the direction about the Z-axis and the laser beam scanning can be performed in the direction about the X-axis according to the pattern illustrated in FIG. 3. In the following description, the rotational angle in the direction about the Z-axis will be denoted by a reference symbol a and will be referred to as the swing angle α, as illustrated in FIG. 2. Further, the azimuth of the projection line of a laser beam in the direction about the S-axis will be denoted by a reference symbol 8 and will be referred to as the scan angle δ.

According to the pattern illustrated in FIG. 3, the laser beam scanning (one scan from one end to the other end of a scanning range) in the direction about the S-axis is repeated at a fixed cycle Δt while changing the swing angle α in a sine-wave manner in a predetermined angle range. In this case, the laser beam scanning can be performed while maintaining the swing angle α substantially constant by, for example, setting the temporal change pattern of the swing angle α such that the amount of change in the swing angle α in the scanning period of time per laser beam is sufficiently small.

Alternatively, for example, the swing angle α may be intermittently changed by a predetermined amount, and each time the swing angle α is changed, the laser beam scanning may be performed in the state in which the swing angle α is maintained constant (a state in which the rotation of the LRF 1a in the direction of the Z-axis is stopped).

Further, for example, the rotational speed of the LRF 1a in the direction about the Z-axis or the timing of the laser beam scanning may be controlled such that the number of scans of a laser beam carried out per unit change amount of the swing angle α is constant or substantially constant.

As described above, the distance measurement data of an object existing in the vicinity of the LRF 1a can be acquired in a three-dimensional manner by rotating the LRF 1a in the direction about the Z-axis and by performing the laser beam scanning (rotational scanning) in the direction about the S-axis.

For example, FIG. 2 illustrates one measurement point P (a laser beam reflection point on the surface of an object) at which a distance r is measured by the LRF 1a in the case where the swing angle α of the LRF 1a is a certain angle and the scan angle δ of a laser beam (the azimuth of the projection line of a laser beam) is a certain angle. In this case, the position of the measurement point P changes in the three-dimensional manner when the swing angle α or the scan angle δ is changed. Thus, each laser ranging device 1 according to the present embodiment makes it possible to acquire the measurement data of the distance of an object existing in the vicinity of the LRF 1a in the three-dimensional manner.

Supplementarily, a set of the distance r, the swing angle α, and the scan angle δ corresponding to a randomly selected measurement point P expresses the position of the measurement point P by a spherical coordinate system. Further, the position of the measurement point P can be coordinate-converted into a position observed in a three-axis orthogonal coordinate system (e.g. the XYZ coordinate system illustrated in FIG. 2) from the set of the distance r, the swing angle α, and the scan angle δ corresponding to the measurement point P.

The system according to the present embodiment uses the two laser ranging devices 1A and 1B configured as described above to perform the distance measurement. In this case, the mutual positional relationship between the laser ranging devices 1A and 1B and the variable ranges of the swing angle α and the scan angle δ of the projection line of a laser beam of each of the laser ranging devices 1A and 1B are set such that the laser beam projection areas (the areas where the distance measurement can be performed) of the laser ranging devices 1A and 1B overlap with each other.

Figure 4:
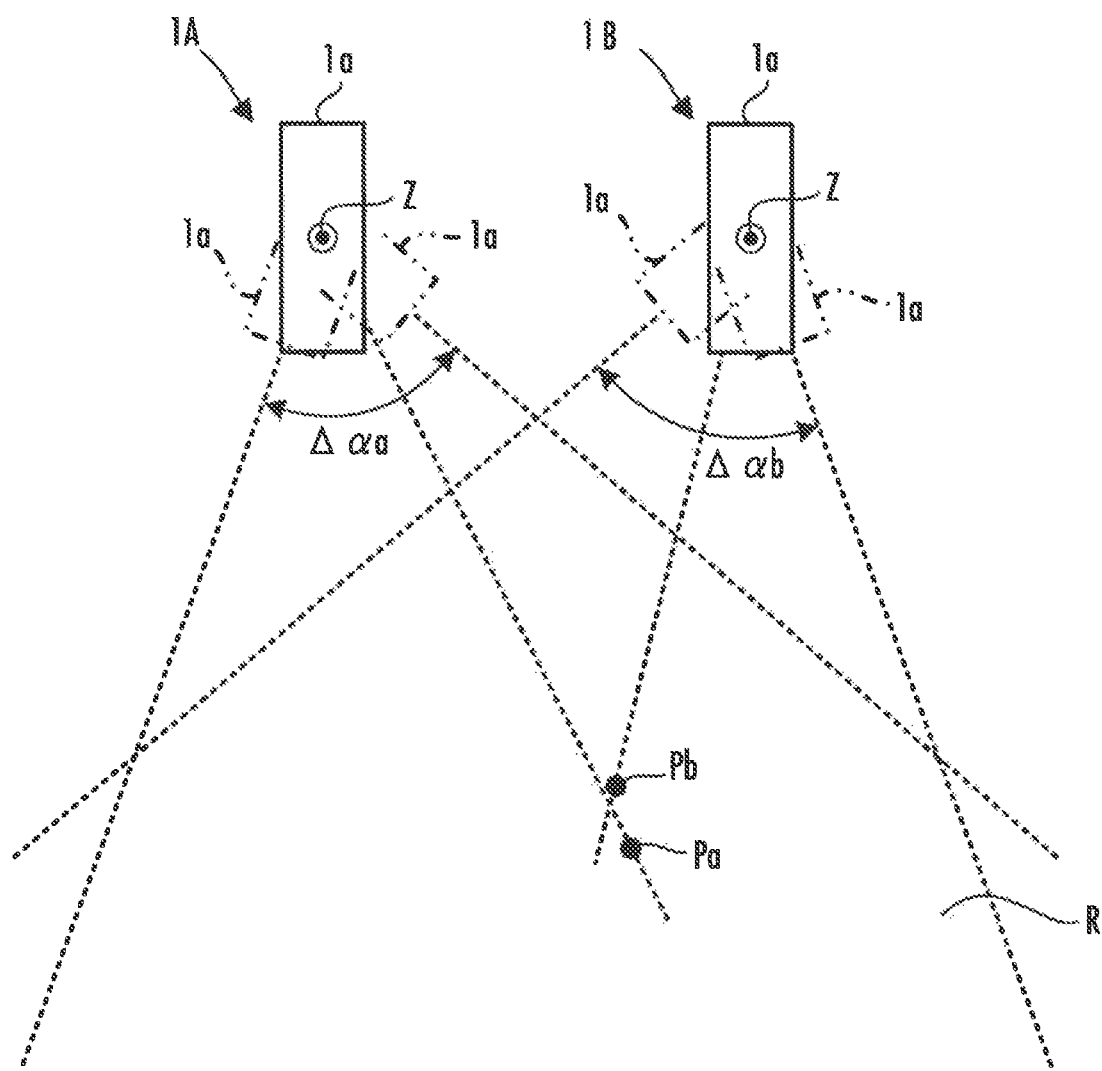
FIG. 4 is a diagram illustrating the projection areas of the laser beams of the two laser ranging devices.

For example, as illustrated in FIG. 4, the laser ranging devices 1A and 1B are placed with an interval provided therebetween such that the Z-axis directions of the laser ranging devices 1A and 1B are parallel or substantially parallel, and the variable range Δαa of the swing angle α of the LRF 1a of the laser ranging device 1A and the variable range Δαb of the swing angle α of the LRF 1a of the laser ranging device 1B are set such that the laser beam projection areas of the laser ranging devices 1A and 1B overlap with each other. In this case, a gray region R in FIG. 4 is the area where the laser beam projection areas of the laser ranging devices 1A and 1B overlap with each other. In the region R (hereinafter referred to as "the measurement overlap region R"), the distance measurement can be performed by both the laser ranging devices 1A and 1B.

In the example illustrated in FIG. 4, the variable ranges of the scan angles 6 of the laser ranging devices 1A and 1B are, for example, the same or substantially the same.

Supplementarily, the mode or the like of the placement of the laser ranging devices 1A and 1B whereby to have the laser beam projection areas of the laser ranging devices 1A and 1B overlap with each other is not limited to the mode described above. For example, the Z-axis directions of the laser ranging devices 1A and 1B may alternatively be directions that intersect with each other.

The foregoing two laser ranging devices 1A and 1B can be installed in a mobile body such as, for example, a mobile robot or a vehicle. In this case, the laser ranging devices 1A and 1B can be used as external world recognition sensors for recognizing the position, the outer contour or the like of an object (a ground surface, a floor surface, an installed object, an obstacle, another mobile body, or the like) that exists in the vicinity of the mobile body.

According to the present embodiment, the measurement data of each of the laser ranging devices 1A and 1B is input to an arithmetic processing unit 2 (illustrated in FIG. 1A). In this case, the measurement data of each of the laser ranging devices 1A and 1B includes data indicating the swing angle $\alpha$ and the scan angle $\delta$ of the projection line of a laser beam at the time of distance measurement in addition to the data indicating a distance measurement value.

The arithmetic processing unit 2 is composed of, for example, one or more electronic circuit units including a CPU, a RAM, a ROM, an interface circuit and the like, or one or more computers, or a combination of the electronic circuit unit and the computer.

The arithmetic processing unit 2 in the present embodiment mainly has a function for controlling the operations of the laser ranging devices 1A and 1B and a function for identifying and eliminating low-reliability noise data from the measurement data of the laser ranging devices 1A and 1B as the functions implemented by a hardware configuration or a program (software configuration) installed in the arithmetic processing unit 2.

The arithmetic processing unit 2 may alternatively be a control unit having a function for controlling the operation of a mobile body equipped with the laser ranging devices 1A and 1B.

The following will describe the processing performed by the arithmetic processing unit 2. The arithmetic processing unit 2 carries out the processing illustrated by the flowchart of FIG. 5. To be specific, in STEP1, the arithmetic processing unit 2 controls the laser ranging devices 1A and 1B to perform the rotation of the LRF 1a of each of the laser ranging devices 1A and 1B and the laser beam scanning thereby to acquire the measurement data of a plurality of measurement points for each of the laser ranging devices 1A and 1B.

In this case, the plurality of measurement points associated with the laser ranging device 1A are measurement points at which one or both of the swing angle $\alpha$ and the scanning angle $\delta$ of the projection line of a laser beam corresponding to each of the plurality of measurement points associated with the laser ranging device 1A are different from each other. Further, the measurement data of each measurement point associated with the laser ranging device 1A includes the data indicating the measurement value of the distance (the distance from the LRF 1a of the laser ranging device 1A) of the measurement point and also includes the data indicating the swing angle $\alpha$ and the scanning angle $\delta$ of the projection line of a laser beam corresponding to the measurement point.

The same applies to the measurement data of each of the plurality of measurement points associated with the laser ranging device 1B.

In the following description, to distinguish a measurement point at which distance measurement has been performed by the laser ranging device 1A and a measurement point at which distance measurement has been performed by the laser ranging device 1B, a measurement point associated with the laser ranging device 1A will be accompanied by a reference symbol Pa and a measurement point associated with the laser ranging device 1B will be accompanied by a reference symbol Pb in some cases.

Subsequently, in STEP2, the arithmetic processing unit 2 searches for a set (a set of the measurement points Pa and Pb) common to the laser ranging device 1A and the laser ranging device 1B from the measurement overlap region R.

One measurement point Pa obtained by the laser ranging device 1A and one measurement point Pb obtained by the laser ranging device 1B being a set of common measurement points means that a local portion of an external world object corresponding to the measurement point Pa (a portion at which a laser beam output in the direction of a projection line corresponding to the measurement point Pa from the LRF 1a of the laser ranging device 1A is reflected) and a local portion of the external world object corresponding to the measurement point Pb (a portion at which a laser beam output in the direction of a projection line corresponding to the measurement point Pb from the LRF 1a of the laser ranging device 1B is reflected) can be regarded as the same portion of the external world object.

In STEP2, the arithmetic processing unit 2 searches for a set of the measurement points Pa and Pb that can be regarded as a set of common measurement points in the sense described above.

In this case, as illustrated in, for example, FIG. 4, if one measurement point Pb obtained by one of the laser ranging devices 1A and 1B, e.g. the laser ranging device 1B, is a point close to the projection line of a laser beam corresponding to the measurement point Pa obtained by the other laser ranging device (the laser ranging device 1A in this case), i.e. if, for example, the distance from the projection line to the measurement point Pb is within a predetermined range), then the set of the measurement points Pa and Pb will be extracted as the set of common measurement points.

Alternatively, for example, a plurality of measurement points Pa on an A side obtained by the laser ranging device 1A and a plurality of measurement points Pb on a B side obtained by the laser ranging device 1B can be coordinate-converted into points observed in a coordinate system common to both the laser ranging devices 1A and 1B, and a set of the measurement points Pa and Pb that are within a predetermined distance when observed in the common coordinate system can be extracted as a set of common measurement points.

Further alternatively, for example, a characteristic portion (an edge or the like) of the shape of an external world object can be identified in advance from all the plurality of measurement points Pa obtained by the laser ranging device 1A and all the plurality of measurement points Pb obtained by the laser ranging device 1B, and then a set of the measurement points Pa and Pb that have positional relationships with respect to the characteristic portion similar to each other can be extracted as a set of common measurement points.

Subsequently, in STEP3, the arithmetic processing unit 2 selects, as a target pair of measurement points Pab(i), a set of measurement points Pa(i) and Pb(i) from among all sets of the measurement points Pa and Pb extracted as the sets of common measurement points.

Then, the arithmetic processing unit 2 carries out the processing in STEP4 and STEP5 on the selected target pair of measurement points Pab(i). The processing in STEP4 and STEP5 is the processing for determining whether the measurement point Pa(i) or Pb(i) constituting the target pair of measurement points Pab(i) is a measurement point having a low-reliability distance measurement value (hereinafter referred to as "the noise measurement points").

In STEP4, the arithmetic processing unit 2 sets existence probability functions Fpa and Fpb for the measurement points Pa(i) and Pb(i), respectively, which constitute the target pair of measurement points Pab(i). The existence probability function Fpa corresponding to the measurement point Pa(i) is a function indicating the distribution of the probability of the existence of a point on the surface of an actual object corresponding to the measurement point Pa(i) (the actual reflection point of a laser beam corresponding to the measurement point Pa(i)), and the existence probability function Fpb corresponding to the measurement point Pb(i) is a function indicating the distribution of the probability of the existence of a point on the surface of an actual object corresponding to the measurement point Pb(i) (the actual reflection point of a laser beam corresponding to the measurement point Pb(i)).

Figure 6A:
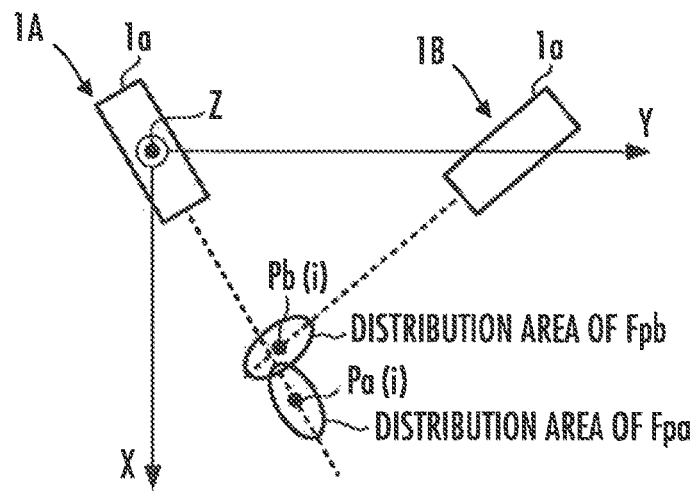
FIG. 6A is a diagram illustrating the distribution areas of existence probability functions set in STEP4 of FIG. 5.

The existence probability functions Fpa and Fpb are represented as functions observed in a coordinate system common to both the laser ranging devices 1A and 1B. In the present embodiment, as the coordinate system that represents the existence probability functions Fpa and Fpb, a two-axis coordinate system that is orthogonal to the Z-axis, which is the axis of rotation of the LRF 1a of the laser ranging device 1A (or 1B), e.g. the XY coordinate system illustrated in FIG. 6A, is used. Further, each of the existence probability functions Fpa and Fpb is represented as the function of a position on the plane of the XY coordinate system (a function having an X-coordinate position and a Y-coordinate position as two variable components).

Figure 6B:
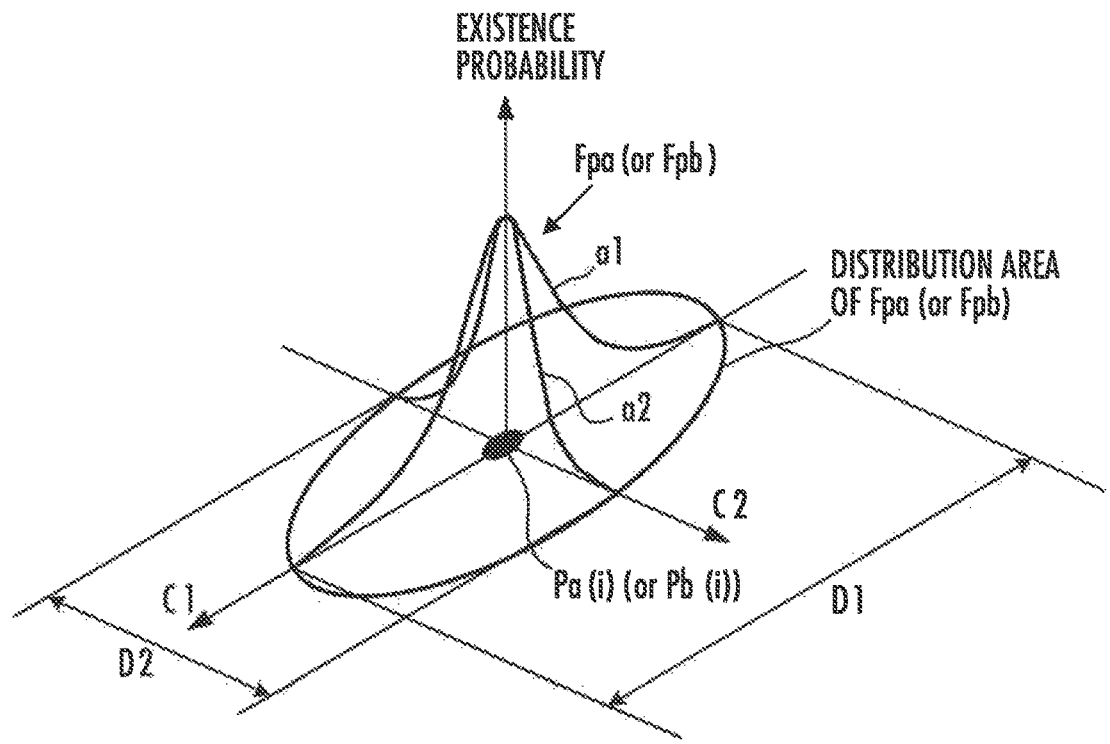
FIG. 6B is a diagram illustrating a pattern of the existence probability functions.

To be specific, the existence probability function Fpa corresponding to the measurement point Pa(i) is set as a two-dimensional normal distribution function (more specifically, a two-dimensional normal distribution function, the peak value of which is a function value at the position of the projection point of the measurement point Pa(i) projected onto the XY-coordinate plane), as illustrated in FIG. 6B, in an elliptical distribution area (refer to FIG. 6A) having, as its central point, a projection point obtained by projecting the measurement point Pa(i) (a point at a position in a three-dimensional space defined by the distance measurement value, the value of the swing angle α, and the value of the scanning angle δ corresponding to the measurement point Pa(i)) onto the XY-coordinate plane. In other words, the existence probability function Fpa as the two-dimensional normal distribution function is set such that the position of the point of projection of the measurement point Pa(i) onto the XY-coordinate plane is the position of a mode.

In FIG. 6B, a curve a1 denotes the waveform of the existence probability function Fpa in a C1-axis direction, which will be discussed later, and a curve a2 denotes the waveform of the existence probability function Fpa in a C2-axis direction, which will be discussed later.

Supplementarily, the existence probability function Fpa is a normal distribution function, so that the position of the projection point of the measurement point Pa(i) on the XY-coordinate plane will be the position of the mode of the existence probability function Fpa and is also the position of an average value.

The elliptical distribution area associated with the existence probability function Fpa is an area corresponding to the existence area in the present invention, and an area that can be regarded to have a high possibility of the existence of the reflection point of an actual external world object corresponding to the measurement point Pa(i) when observed in a direction (the Z-axis direction) orthogonal to the XY-coordinate plane. The distribution area is, for example, an area on the XY plane in which the function value of the existence probability function Fpa is a predetermined value or more.

Further, as illustrated in FIG. 6B, the distribution area is an elliptical area having one of the C1-axis direction, which is the direction of the line obtained by projecting the projection line of a laser beam corresponding to the measurement point Pa(i) onto the XY-coordinate plane (the line denoted by the dashed line in FIG. 6A), and the C2-axis direction, which is the direction of the line on the XY plane that is orthogonal to the C1-axis direction, defined as the direction of a long axis, and the other defined as the direction of a short axis. Further, a width D1 of the distribution area in the C1-axis direction is set according to a predetermined error range of the distance measurement value of each measurement point obtained by the laser ranging device 1A (the range of errors that can occur in the laser ranging device 1A due to the specification or performance of the laser ranging device 1A).

For example, if the error range of the distance measurement value obtained by the laser ranging device 1A is $\pm\Delta r$, then $D1=K1\times 2\times\Delta r$ (K1 being 1 or a positive constant value close thereto). Thus, the value of D1 can be set to a value that is proportional to the magnitude (absolute value) of the error range $\pm\Delta r$.

Further, a width D2 of the distribution area in the C2-axis direction is set according to a predetermined error range of the value of the swing angle α of each measurement point obtained by the laser ranging device 1A (the range of errors that can occur in the laser ranging device 1A due to the control accuracy of the swing angle α or a detection error of the swing angle α of the laser ranging device 1A) and the length of a segment obtained by projecting the segment from the reference point (the reference point of distance measurement) of the laser ranging device 1A to the measurement point Pa(i) onto the XY-coordinate plane (i.e. the distance from the reference point of the laser ranging device 1A to the measurement point Pa(i) when observed from the projection onto the XY-coordinate plane).

For example, if the distance of the measurement point Pa(i) observed by projection onto the XY-coordinate plane is denoted by rxy, and the error range of the swing angle α is $\pm\Delta\alpha$, then $D2=K2\times rxy\times 2\times\Delta\alpha$ (K2 being 1 or a constant value close thereto). Thus, the value of D2 may be set to a value that is proportional to the product of the distance rxy and the magnitude (absolute value) of the error range $\pm\Delta\alpha$.

The above description is the description related to the existence probability function Fpa corresponding to the measurement point Pa(i). The same applies to the existence probability function Fpb corresponding to the measurement point Pb(i). In this case, in the above description related to the existence probability function Fpa, the existence probability function Fpa, the laser ranging device 1A, and the measurement point Pa(i) are to be rewritten to the existence probability function Fpb, the laser ranging device 1B, and the measurement point Pb(i) to provide the description related to the existence probability function Fpb corresponding to the measurement point Pb(i).

According to the present embodiment, the existence probability functions Fpa and Fpb are set as described above in STEP5, so that the processing in STEP5 serves also as the processing for setting an existence area in the present invention.

Further, in the above description, for the sake of convenience, the distribution areas of the existence probability functions Fpa and Fpb have been described as the elliptical areas. However, the distribution area of the existence probability function Fpa may be a circular area, depending on the sizes of the error ranges $\pm\Delta r$ and $\pm\Delta\alpha$ related to the laser ranging device 1A or the distance of the measurement point Pa(i). The same applies to the distribution area of the existence probability function Fpb. Hence, according to the present embodiment, the elliptical areas as the distribution areas of the existence probability functions Fpa and Fpb may include circular areas as one type thereof.

Further, in FIG. 6A and FIG. 6B, the long-axis direction of the elliptical area as the distribution area of each of the existence probability functions Fpa and Fpb has been illustrated as the C1-axis direction (the direction of the line obtained by projecting the projection line of a laser beam onto the XY-coordinate plane). However, the short-axis direction of the elliptical area is the C1-axis direction (the direction of the line obtained by projecting the projection line of a laser beam onto the XY-coordinate plane) in some cases.

Supplementarily, according to the present embodiment, the error range of the value of the scanning angle δ of each measurement point obtained by the laser ranging device 1A (the range of errors attributable to the control accuracy of the scanning angle δ or the detection error of the scanning angle δ of the LRF 1a of the laser ranging device 1A) is regarded to be sufficiently small, and the error range of the scanning angle δ is not reflected on the distribution areas of the existence probability functions Fpa and Fpb.

However, the error range of the scanning angle δ can be taken into account in setting the existence probability functions Fpa and Fpb. In this case, the existence probability functions Fpa and Fpb may be set as, for example, three-dimensional normal distribution functions. If this setting is performed, then the distribution areas of the existence probability functions Fpa and Fpb corresponding to the existence areas in the present invention will be areas in a three-dimensional space.

Returning to FIG. 5, in STEP5, the arithmetic processing unit 2 determines a noise measurement point according to the overlapping state of the existence probability functions Fpa and Fpb set as described above in STEP4.

Figure 7A:
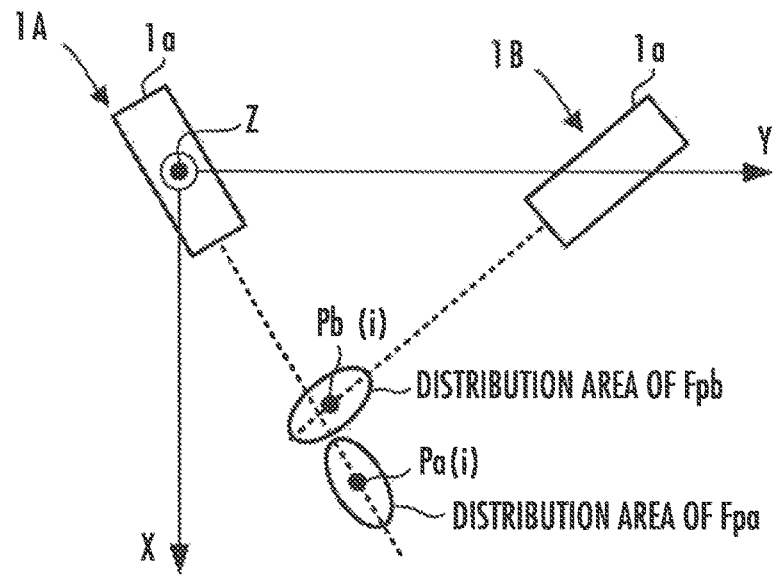
FIG. 7A and FIG. 7B are diagrams for explaining the processing in STEP5 of FIG. 5.

More specifically, if the distribution areas of the existence probability functions Fpa and Fpb do not overlap with each other as illustrated in FIG. 7A, then the arithmetic processing unit 2 determines both the measurement points Pa(i) and Pb(i), which constitute the target pair of measurement points Pab(i), as noise measurement points.

Figure 7B:
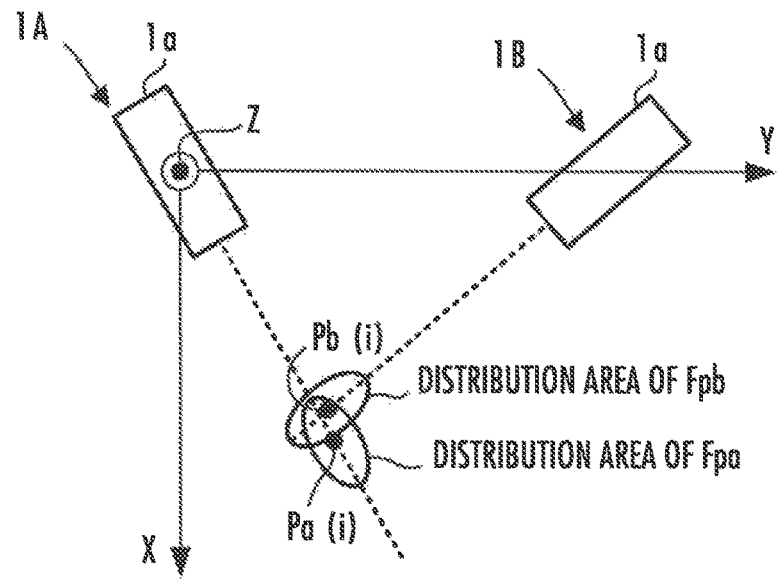

Further, as illustrated in FIG. 7B, if the distribution areas of the existence probability functions Fpa and Fpb partially overlap with each other and the projection point of a measurement point corresponding to the position of the average value of one of the existence probability functions Fpa and Fpb (the measurement point Pb(i) corresponding to the existence probability function Fpb in the illustrated example) lies in the distribution area of the other existence probability function (the distribution area of the existence probability function Fpa in the illustrated example), then the arithmetic processing unit 2 determines that, for example, both the measurement points Pa(i) and Pb(i) are not noise measurement points.

Figure 8A:
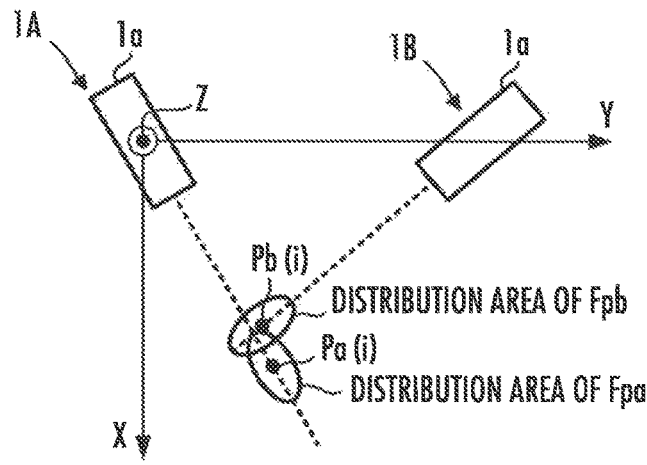
FIG. 8A, FIG. 8B, and FIG. 8C are diagrams for explaining the processing in STEP5 of FIG. 5.
Figure 9A:
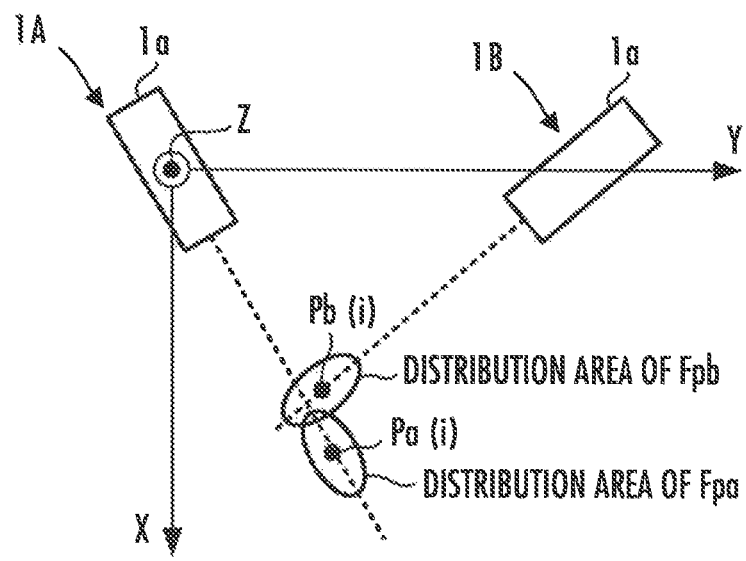
FIG. 9A and FIG. 9B are diagrams for explaining the processing in STEP5 of FIG. 5.

Further, if the projection point of the measurement point Pa(i) corresponding to the position of the average value of the existence probability function Fpa does not lie in the distribution area of the existence probability function Fpb and the projection point of the measurement point Pb(i) corresponding to the position of the average value of the existence probability function Fpb does not lie in the distribution area of the existence probability function Fpa, although the distribution areas of the existence probability functions Fpa and Fpb partially overlap with each other, as illustrated in FIG. 8A or FIG. 9A, then the arithmetic processing unit 2 first carries out the processing described below.

The arithmetic processing unit 2 calculates a corrected existence probability function Fpb' by correcting the existence probability function Fpb corresponding to one of the existence probability functions Fpa and Fpb, e.g. the existence probability function Fpb corresponding to the measurement point Pb(i), according to expressions (1a) and (1b) given below.

Regarding the distribution area of Fpb, in the area excluding an area overlapping with the distribution area of Fpa;

$$Fpb'=Fpb \quad (1a)$$

Regarding the distribution area of Fpb, in the area overlapping with the distribution area of Fpa;

$$Fpb'=Fpb+Fpa \quad (1b)$$

Figure 8B:
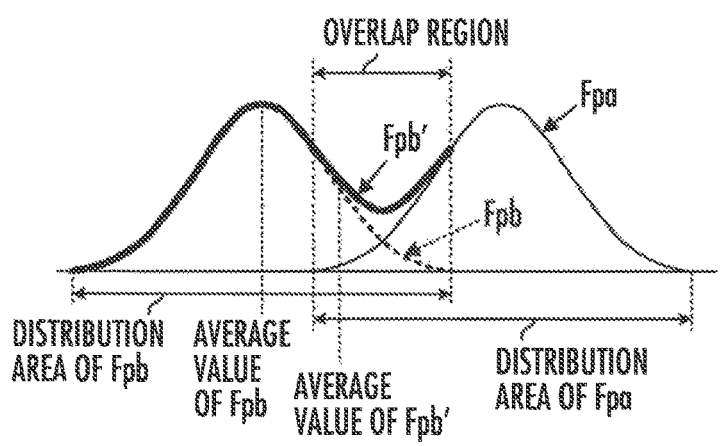

FIG. 8B conceptually illustrates the processing for calculating the corrected existence probability function Fpb' as one-dimensional processing for the sake of convenience. As illustrated, the corrected existence probability function Fpb' is obtained by adding the function value of Fpa to the function value of Fpb (the result of combining the function values of Fpb and Fpa) in the area where the existence probability functions Fpa and Fpb overlap with each other (hereinafter referred to simply as "the overlap region"), or coincides with Fpb in the remaining area.

Then, the arithmetic processing unit 2 determines the position of the average value of the corrected existence probability function Fpb' calculated as described above. The existence probability function Fpb before the correction is a normal distribution function, so that the position of the average value coincides with the position of the projection point of the measurement point Pb(i).

Meanwhile, regarding the corrected existence probability function Fpb', the function value in the foregoing overlap region of the distribution area (=the distribution area of Fpb) is obtained by adding the function values of the existence probability functions Fpa and Fpb. Hence, the position of the average value of the corrected existence probability function Fpb' will be a position that is closer to the foregoing overlap region (the position of a point Pb' in FIG. 8C) than the position of the average value of the existence probability function Fpb before the correction (the projection point of the measurement point Pb(i)), as illustrated in FIG. 8B and FIG. 8C.

Figure 8C:
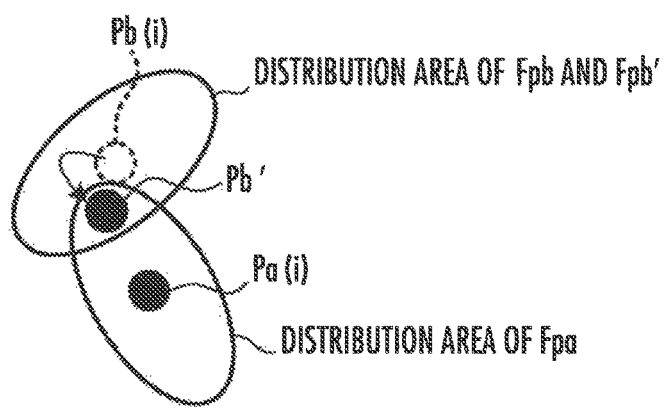

In this case, if the foregoing overlap region is increased to a certain extent as illustrated in FIG. 8A, then the position of the average value of the corrected existence probability function Fpb' (the position of the point Pb') comes to lie in the distribution area of the existence probability function Fpa, as illustrated in FIG. 8C. Thus, if the position of the average value of the corrected existence probability function Fpb' lies in the distribution area of the existence probability function Fpa, then the arithmetic processing unit 2 determines that both the measurement points Pa(i) and Pb(i) are not noise measurement points.

Figure 9B:
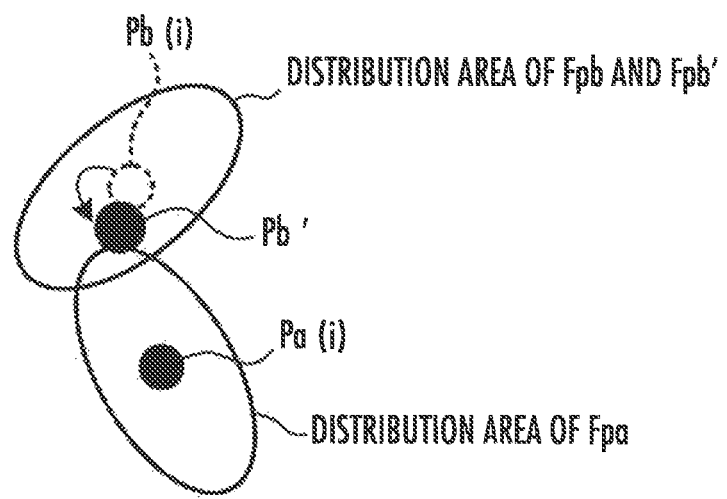

Further, as illustrated in FIG. 9A, if the foregoing overlap region is small, then the position of the average value of the corrected existence probability function Fpb' (the position of the point Pb') will be a position that deviates from the distribution area of the existence probability function Fpa, as illustrated in FIG. 9B. Thus, if the position of the average value of the corrected existence probability function Fpb' deviates from the distribution area of the existence probability function Fpa, then one of the measurement points Pa(i) and Pb(i), e.g. the measurement point Pb(i), will be determined as a noise measurement point and the other measurement point Pa(i) will be determined as not a noise measurement point.

In the foregoing STEP5, the noise measurement points are determined (identified) according to the overlapping state of the existence probability functions Fpa and Fpb as described above.

Returning to FIG. 5, the arithmetic processing unit 2 then determines in STEP6 whether the sequential selection of the target pair of measurement points (Pa(i) and Pb(i)) has been terminated.

If the determination result is negative, then the arithmetic processing unit 2 returns to the foregoing STEP3 to select a new target pair of measurement points (Pa(i) and Pb(i)) and carries out the processing in STEP4 and STEP5 on the new target pair of measurement points (Pa(i) and Pb(i)) as described above.

Thus, the processing in STEP3 to STEP5 is repeated until the determination result in STEP6 becomes affirmative. This will identify the noise measurement points.

If the determination result in STEP6 becomes affirmative, then the arithmetic processing unit 2 deletes the measurement data of each noise measurement point as noise data in STEP7. This terminates the processing of the flowchart of FIG. 5.

If it is determined that both the measurement points Pa(i) and Pb(i), which constitute the target pair of measurement points, are not noise measurement points, then the measurement data on one of the measurement points Pa(i) and Pb(i) may be deleted as a redundant measurement point.

As described above, according to the present embodiment, noise measurement points and measurement points that are not noise measurement points can be properly discriminated and identified by using the measurement data of the two laser ranging devices 1A and 1B.

In particular, as described above, noise measurement points can be discriminated from measurement points that are not noise measurement points and can be identified with high reliability by using the existence probability functions Fpa and Fpb and the distribution areas thereof.

In the embodiment described above, the description has been given of the system equipped with the two laser ranging devices 1A and 1B. However, the present invention can be applied also to a system equipped with three or more laser ranging devices.

Further, the LRF 1a of each laser ranging device 1 in the foregoing embodiment is adapted to perform laser beam scanning by rotating the projecting direction of a laser beam. Alternatively, however, the LRF 1a may be adapted to linearly emit a laser beam in a direction that is orthogonal to the projecting direction of the laser beam while maintaining the laser beam projecting direction constant or substantially constant.

Further, each laser ranging device 1 may be configured to linearly displace the LRF 1a by an actuator.

What is claimed is:

1. A method for identifying noise data of a plurality of laser ranging devices among measurement data obtained by the plurality of laser ranging devices each of which projects a laser beam in a direction of each of a plurality of projection lines to measure a distance of each of a plurality of measurement points corresponding to the plurality of projection lines, the method comprising:
a first step of acquiring the measurement data of the plurality of measurement points in projection areas of the laser beams by each of the plurality of laser ranging devices, the plurality of laser ranging devices being placed such that the projection areas of the laser beams overlap with each other; and
a second step of extracting, from the plurality of measurement points, a set of common measurement points, which are measurement points from among the plurality of measurement points common to an n number the plurality of laser ranging devices, and identifying the noise data to be deleted from the measurement data of each of an n number of measurement points based on the measurement data of the n number of measurement points that constitute the set of common measurement points,
wherein n is an integer of 2 or more,
wherein the second step includes a step 2a of setting an existence area, in which it is estimated that an actual reflection point of a laser beam corresponding to each of the n number of measurement points exists in the vicinity of the position of each of the n number of measurement points defined by the measurement data of each of the n number of measurement points constituting the set of common measurement points, and a step 2b of identifying the noise data based on the mutual overlapping state of an n number of the existence areas set for the n number of measurement points, and
wherein the step 2a is configured to set each existence area such that each of the n number of existence areas has a size determined based on a predetermined value in an error range of a measurement value of the distance of the measurement point indicated by the measurement data of a measurement point corresponding to each existence area and a predetermined value of an error range of a direction of the projection line of a laser beam corresponding to the measurement point.

2. The method for identifying noise data of the laser ranging devices according to claim 1,
wherein the step 2b is configured to identify, as noise data, the measurement data of at least one measurement point among the n number of measurement points in a case where the n number of existence areas do not overlap with each other.

3. The method for identifying noise data of the laser ranging devices according to claim 1,
wherein the n number is two, and
the step 2b is configured to determine, in a case where two existence areas corresponding to the two measurement points overlap with each other such that one existence area of the two existence areas includes a measurement point corresponding to the other existence area, that the measurement data of the measurement point corresponding to at least the one existence area is not the noise data.

4. The method for identifying noise data of the laser ranging devices according to claim 1,
wherein the n number is two, and
the second step further includes:
a step 2c of setting an existence probability function for each existence area corresponding to each of the two measurement points such that the position of a measurement point corresponding to the existence area is the position of a mode, the existence probability function representing the distribution of the existence probability of the actual reflection point corresponding to the existence area by normal distribution;
a step 2d of preparing a corrected existence probability function in a case where two existence areas overlap with each other such that one existence area of the two existence areas corresponding to the two measurement points does not include a measurement point corresponding to the other existence area and the other existence area does not include a measurement point corresponding to the one existence area, the corrected existence probability function being obtained by correcting the existence probability function corresponding to one existence area of the two existence areas such that a function value in an area where the two existence areas overlap with each other becomes a resultant value of the function values of the 5 existence probability functions corresponding to the two existence areas; and a step 2e of determining, in a case where a position of an average value of the corrected existence probability function is included in the other existence area of the two existence areas, that the measurement data of at least one measurement point of the two measurement points is not the noise data, and determining, in a case where the position of the average value of the corrected existence probability function is not included in the other existence area of the two existence areas, that the measurement data of at least one measurement point of the two measurement points is the noise data.

* * * * *